(12) United States Patent
Fang et al.

(10) Patent No.: US 10,740,944 B2
(45) Date of Patent: Aug. 11, 2020

(54) AUGMENTED FACIAL ANIMATION

(71) Applicant: Intel Corporation, Santa Clara, CA (US)

(72) Inventors: Yikai Fang, Beijing (CN); Yangzhou Du, Beijing (CN); Qiang Eric Li, Beijing (CN); Xiaofeng Tong, Beijing (CN); Wenlong Li, Beijing (CN); Minje Park, Seongnam (KR); Myung-Ho Ju, Seoul (KR); Jihyeon Kate Yi, Gwanak-Gu (KR); Tae-Hoon Pete Kim, Seoul (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/172,664

(22) Filed: Oct. 26, 2018

(65) Prior Publication Data

US 2019/0304155 A1    Oct. 3, 2019

Related U.S. Application Data

(63) Continuation of application No. 15/822,271, filed on Nov. 27, 2017, now abandoned, which is a continuation of application No. 14/779,501, filed as application No. PCT/CN2014/094618 on Dec. 23, 2014, now Pat. No. 9,830,728.

(51) Int. Cl.
*G06T 13/40* (2011.01)
*G06K 9/00* (2006.01)
*G06T 5/00* (2006.01)

(52) U.S. Cl.
CPC .......... *G06T 13/40* (2013.01); *G06K 9/00255* (2013.01); *G06K 9/00315* (2013.01); *G06K 9/00355* (2013.01); *G06T 5/002* (2013.01); *G06T 2207/10016* (2013.01); *G06T 2207/20092* (2013.01); *G06T 2207/20182* (2013.01); *G06T 2207/30201* (2013.01)

(58) Field of Classification Search
CPC .......... G06T 13/40; G06T 2207/30201; G06T 13/00; G06T 2207/10016; G06K 9/00248; G06K 9/00302; G06K 9/00268; H04N 7/157; H04N 5/23219
See application file for complete search history.

(56) References Cited

U.S. PATENT DOCUMENTS

| | | | |
|---|---|---|---|
| 2004/0179037 A1* | 9/2004 | Blattner | G06T 13/40 715/751 |
| 2011/0296324 A1* | 12/2011 | Goossens | G06Q 10/10 715/763 |
| 2013/0013089 A1* | 1/2013 | Kawakami | H04N 21/2187 700/90 |
| 2014/0176662 A1* | 6/2014 | Goodman | H04W 4/21 348/14.07 |

* cited by examiner

*Primary Examiner* — Haixia Du
(74) *Attorney, Agent, or Firm* — Barnes & Thornburg LLP

(57) ABSTRACT

Examples of systems and methods for augmented facial animation are generally described herein. A method for mapping facial expressions to an alternative avatar expression may include capturing a series of images of a face, and detecting a sequence of facial expressions of the face from the series of images. The method may include determining an alternative avatar expression mapped to the sequence of facial expressions, and animating an avatar using the alternative avatar expression.

30 Claims, 6 Drawing Sheets

AUGMENTED FACIAL ANIMATION

PRIORITY

This patent application is a continuation of U.S. patent application Ser. No. 14/779,501, filed Sep. 23, 2015, which claims the benefit of priority to U.S. National Stage Application under 35 U.S.C. 371 from International Application PCT/CN2014/094618, filed Dec. 23, 2014, all of which are hereby incorporated by reference in their entirety.

BACKGROUND

Users of mobile devices have access to text messaging, image messaging, video, and phone calling. But for those users, expressing emotions or facial features in messages is difficult without using video. Additionally, users may be self-conscious and not want to be on video. An avatar to mimic the face of a user is used to simulate human expression of the user. However, avatars are not able to support augmented expressions.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

One way to display emotions or facial features on an avatar is to use an augmented or alternative avatar expression, which is a nonhuman-like expression. An alternative avatar expression may be an exaggerated expression beyond the capabilities of a human to express on a face. Some existing avatar applications may use icons or text bubbles to accessorize an avatar, but do not show an alternative avatar expression on the avatar. Further, the icons or text bubbles are triggered by a button push or touch operation on a mobile device, which is disruptive for the user. In an example, the alternative avatar expression described below may be triggered by a sequence of facial features detected by a mobile device. Facial emotion is a key ingredient in visual communication. In an example, a method of determining an emotion classification for a facial expression may be used with an animated avatar to display the emotion classification. The method of determining the emotion classification may include determining the emotion classification and animating an avatar in response to determining the emotion classification while minimizing computational cost or time.

Figure 1:
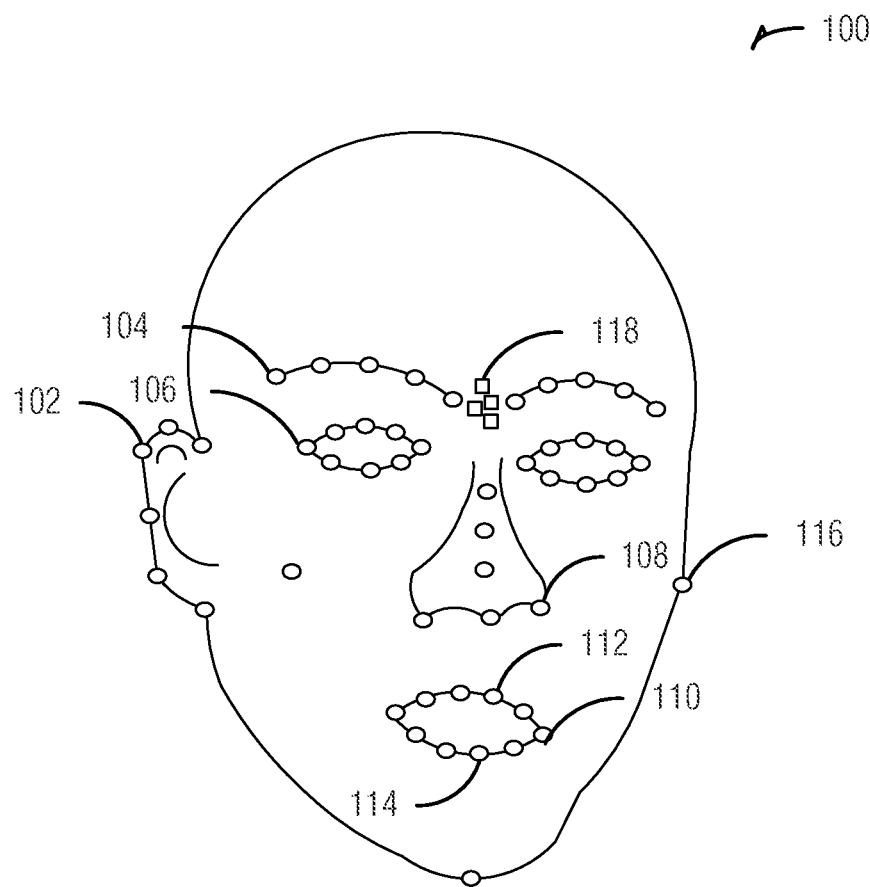
FIG. 1 is a diagram illustrating a face with landmark points, according to an embodiment.
Figure 2A:
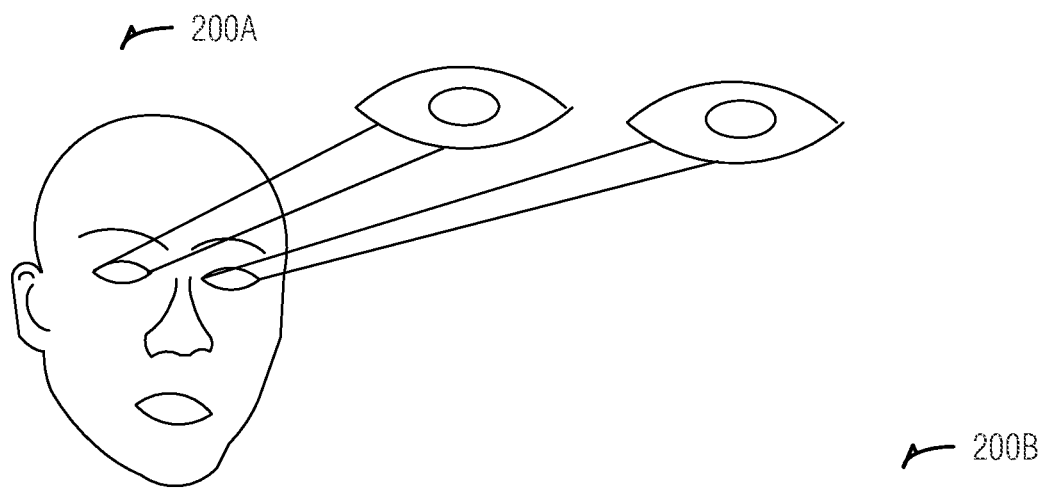
FIGS. 2A-2C are diagrams illustrating animated faces, according to an embodiment.

FIG. 1 is a diagram illustrating a face 100 with landmark points, according to an embodiment. The face 100 includes multiple landmark points, including points on an ear 102, an eyebrow 104, an eye 106, a nose 108, a mouth 110, 112, and 114, and a cheek 116. In an example, the landmark points (e.g., 102, 104, 106, 108, 110, 112, or 114) may be used to animate an avatar using an alternative avatar expression. For example, a specific movement pattern of a landmark, such as the eyebrow 104 raising a specified distance, may be a sequence of facial expressions. The sequence of facial expressions may be recognized and detected as a specific movement pattern of the landmark, and the sequence of facial expressions may be mapped to an alternative avatar expression. For example, a specific pattern of the eyebrow 104 raising may be mapped to eyes popping out (as shown in FIG. 2A). The trigger for animating an alternative avatar expression may be solely due to the detected sequence of facial expressions or movement of landmark points, or may use additional factors, such as a user indication to enter an alternative avatar expression mode.

In an example, landmark points (e.g., 102, 104, 106, 108, 110, 112, or 114) may be used to detect and classify emotions or expressions (e.g., emotion classifications), such as a neutral, angry, disgusted, happy, surprised, or sad face. For example, surprise may be a detected emotion classification using geometric information, such as a distance between a point on an eye 106 and a point on an eyebrow 104. In another example landmark points such as forehead textual point 118, may be used to determine an emotion classification. For example, using a density of landmark points in an area of the face 100 between the eyebrows including the forehead textual point 118, it may be determined that the face shows anger. In another example, both a distance between landmark points and a density of landmark points in an area may be used to determine an emotion classification. For example, determining an emotion classification of disgust may include determining a distance between the eye point 106 and the eyebrow point 104 as well as a density of landmark points around forehead textual point 118. Other examples may include a relative position of the landmark points on the mouth (e.g., 110, 112, and 114). Determining an emotion classification of happiness or sadness may include determining a distance between landmark points on the mouth, such as 112 and 114. The emotion classification of happiness or sadness may include a position or movement of a corner of the mouth 110.

Figure 2B:
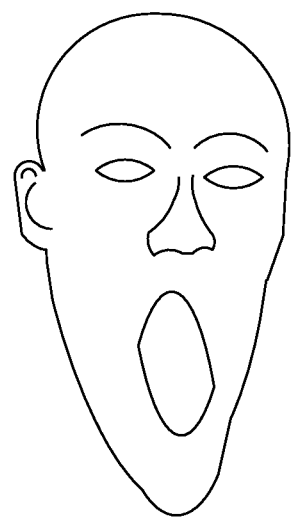
Figure 2C:
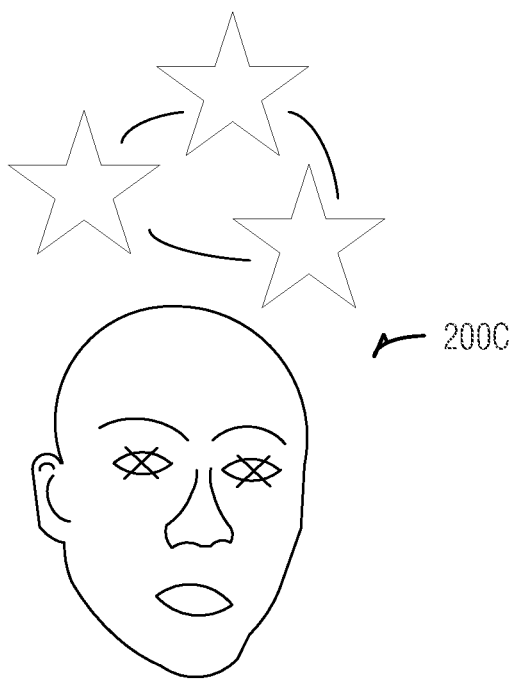

FIGS. 2A-2C are diagrams illustrating animated faces 200A, 200B, and 200C, according to an embodiment. FIGS. 2A-2C illustrate examples of alternative avatar expressions. FIG. 2A includes a face 200A illustrating an alternative avatar expression of eyes popping out. FIG. 2B includes a face 200B illustrating an alternative avatar expression of a jaw dropping. FIG. 2C includes a face 200C illustrating an alternative avatar expression of stars over the face 200C and an "X" over each eye. Other alternative avatar expressions not shown include, but are not limited to, a tongue unrolling out of a mouth, steam coming out of ears or face turning red, a neck or head spinning around (e.g., after being punched as in a cartoon), a nose growing, a vein popping out of a forehead, etc.

The alternative avatar expressions may be triggered by or mapped to a sequence of facial expressions performed by the user, such as eyes rolling, an eyebrow lifting, ears twitching, a head or face shaking back and forth or nodding up and down, a nose flaring or twitching, a mouth opening or jaw lowering, a jaw moving side to side, showing teeth in a mouth, snapping teeth, a tongue sticking out, rolling, or wagging, an eye winking, eyes blinking, or the like. The alternative avatar expression may also be mapped to hand gestures or shoulder motions of the user. For example, a finger extending from a nose of a face may be mapped to an alternative avatar expression showing a nose growing, or shoulders shrugging may be mapped to an alternative avatar expression showing question marks or stars floating over a face. Other alternative avatar expressions and other facial features may be used. In an example, a facial feature may be mapped to any one or more alternative avatar expressions, or an alternative avatar expression may be mapped to any one or more facial feature. In another example, a facial feature expressed by a user may be mapped to an analogous alternative avatar expression (e.g., raising eyebrows three times is mapped to eyes popping out as in face 200A), although this is not necessary (e.g., the mapping may be arbitrary).

In an example, an alternative avatar expression may be a special blend shape that may be integrated into existing avatar blend shapes for animation. Interferences may exist between a special blend shape and an existing avatar blend shape. The interference may be handled by using an adjustment to remove artifacts caused by the interference between adjacent or associated blend shapes.

Figure 3:
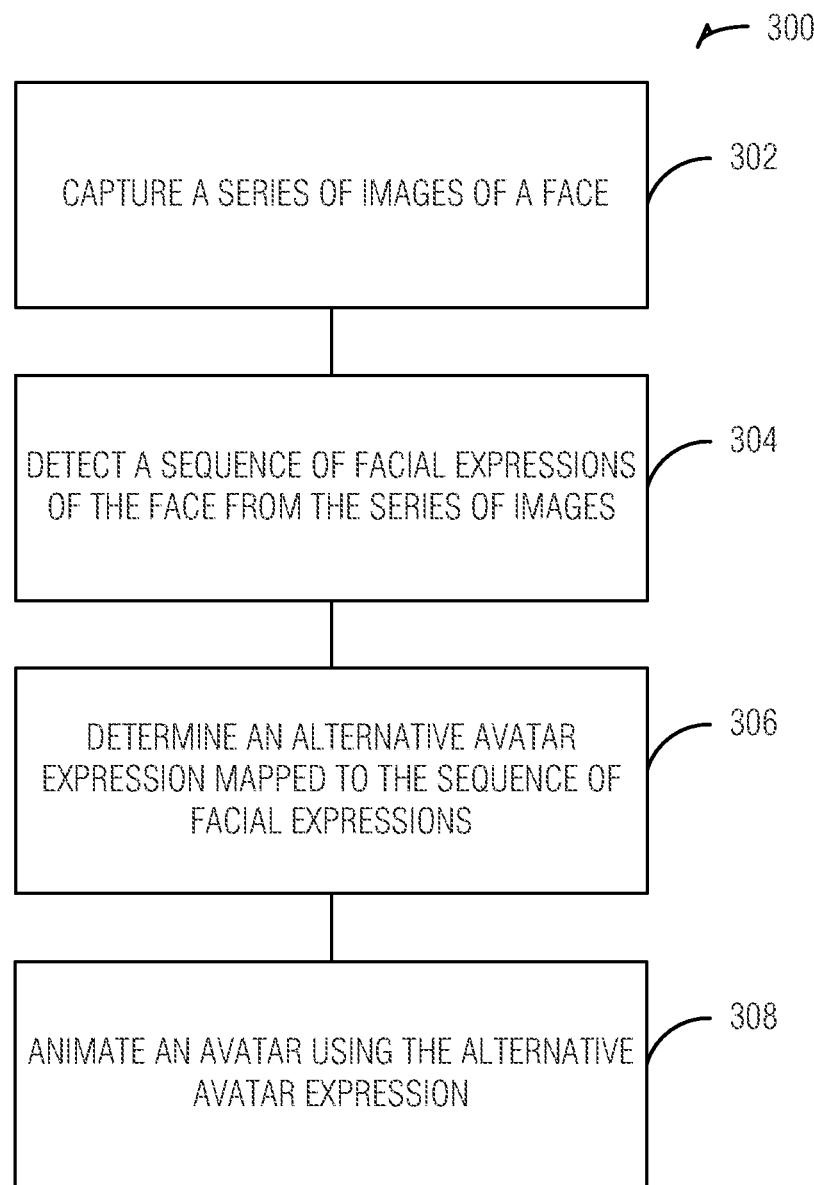
FIG. 3 is a flowchart illustrating a method for animating an avatar using an alternative avatar expression, according to an embodiment.

FIG. 3 is a flowchart illustrating a method 300 for animating an avatar using an alternative avatar expression, according to an embodiment. In an example, the method 300 includes an operation 302 to capture a series of images of a face. The method 300 includes an operation 304 to detect a sequence of facial expressions of the face from the series of images. In an example, detecting the sequence of facial expressions may include detecting the sequence of facial expressions during a specific time frame, such as within a specified number of milliseconds, seconds, minutes, etc. In this manner, the method 300 ensures that random, sporadic, or inadvertent facial expressions over a long period are not interpreted as a triggering sequence of facial expressions. The method 300 may include resetting a timer if no sequence of facial expressions is detected during the specific time frame. The timer may measure the specific time frame, and if the sequence of facial expressions is too slow and the timer expires before the sequence is complete, the sequence may not be detected. In another example, detecting the sequence of facial expressions may include detecting movement of a specified landmark point on the face. Detecting movement may include detecting repeated movement, such as eyebrows raising multiple times, a head shaking back and forth, eyes blinking, a mouth opening repeatedly, etc. The repeated movement may be required to be done within the specific time frame for the sequence to be detected. In an example, the landmark point may be a tip of a nose, and when a face moves back and forth, the tip of the nose may be tracked as a landmark point. The movement of the tip of the nose may then be detected to include a sequence mapped to an alternative avatar expression. In another example a trajectory of the landmark may be detected, recognized, and may trigger an alternative avatar expression. The trajectory may include a path traveled, a speed, a projected path, a projected speed, an acceleration, or the like.

A specified landmark point may include a user defined specific landmark point. The detected movement may be done using dynamic time warping. Dynamic time warping is a technique for measuring similarities or differences between temporal sequences. Using dynamic time warping, the method 300 may detect changes to landmarks on the face. The method 300 may also use a support vector machine (SVM) to detect movement of the specified landmark point.

The method 300 may include an operation 306 to determine an alternative avatar expression mapped to the sequence of facial expressions. Determining the alternative avatar expression may include determining the alternative avatar expression using hand gestures or shoulder motions from the series of images. The hand gestures or shoulder motions may be present in the series of images and detected using techniques similar to those described above for detecting a sequence of facial expressions. The method 300 may use a sequence of facial expressions, a hand gesture, a shoulder motion, or a combination to determine the alternative avatar expression.

In an example, the method 300 includes an operation 308 to animate an avatar using the alternative avatar expression. The method 300 may include animating the avatar by mimicking the sequence of facial expressions. For example, the method 300 may include animating separate parts of the avatar concurrently when mimicking the sequence of facial expressions and using the alternative avatar expression. While use of augmented or alternative expressions is generally described, it is understood that more simplified animations of an avatar that mimic the user's expressions may also be used in combination with augmented expressions. For example, when a user smiles, the corresponding user avatar may also smile in a non-augmented manner (e.g., mimicking the user's facial expression). But when a user smiles and raises his or her eyebrows in a specific pattern (e.g., 3 times quickly), the avatar may both smile and have augmented eyes popping out from the avatar's face as an animation.

Mimicking the sequence of facial expressions may include animating a face of an avatar to smile and the alternative avatar expression may include animating the face of the avatar to have the eyes of the avatar pop out. Both animations may be done concurrently so the avatar's face smiles and the eyes pop out in overlapping time. The concurrent animations may be separately created and displayed, although they may appear to be the same animation. For the example above, the eyes popping out may be a separate animation than the mimicked avatar smiling, and if eyes on the face the animation are mimicking squint, the avatar may ignore that input when mimicking the face since the alternative avatar expression is animating the eyes. The animations may also be done sequentially. In another example, animating the avatar may include animating the avatar in a blended animation when mimicking the sequence of facial expressions and using the alternative avatar expression. For example, concurrent animation may include separate animation modules to animate the alternative avatar expression and the mimicked animation and display the animations together. In another example, blended animation may include a combined animation module to animate the alternative avatar expression and the mimicked animation together. With the blended avatar in the eyes popping out and smiling avatar example above, when the eyes on the face squint, the blended avatar may have eyes popping out that squint at the same time. Not all combinations for blending or concurrent display of mimicking a face and displaying alternative avatar expressions may be possible. The method 300 may include not displaying impossible combinations.

The method 300 may rank displaying the alternative avatar expressions over the mimicked expressions or vice versa, or the ranking may depend on the type of mimicked expression or the type of alternative avatar expression. Animating the blended avatar may include smoothing out interference in the blended animation by removing artifacts. The blended avatar may include simple animation, such as icons (e.g., stars for a dizzy expression as shown in FIG. 2C), or exaggerated facial actions, such as a movement of an avatar facial feature (e.g., jaw drop as shown in FIG. 2B).

In another example, the method 300 may include using an equation for blended animation. For example, an equation for an animation shape "B" may include:

$$B = B_0 + \sum_{i=0}^{n} B_i + B_\alpha$$

Where $B_\alpha$ denotes the alternative avatar expression blend shape, $B_0$ denotes a mean blend shape, and $B_i$ denotes ordinary expression blend shapes. If $B_\alpha$ is independent of ordinary expression blend shapes, then there will be no interference. For example, an alternative expression blend shape for a nose extending may be independent of ordinary expression blend shapes. If $B_\alpha$ is not independent of ordinary expression blend shapes, then there will be an overlap and interference. In an example, an adjustment may be introduced to the equation to remove artifacts or undesired geometry. For example, in FIG. 2B, the geometry of the jaw may affect the geometry of a tongue, teeth, or muscles around the mouth. The adjustment may be used to correct these geometries. For example, an equation for the animation shape "B" may include adjustment $D_\alpha$:

$$B = B_0 + \sum_{i=0}^{n} B_i + B_\alpha + D_\alpha$$

In an example, the method 300 may include an alternative avatar expression including a Graphics Interchange Format (GIF) image or a video. The GIF image or video may be displayed concurrently with a mimicked animation as described above. The GIF image or video may be overlaid on the mimicked animation or on another alternative avatar expression.

In another example, the method 300 may include an operation to receive a user indication selecting the alternative avatar expression. A user may select the alternative avatar expression from a list of possible alternative avatar expressions or create one. The method 300 may include receiving a user indication to enter an alternative avatar expression mode before detecting the sequence of facial expressions of the face. A user may turn the animation of the alternative avatar expression on or off.

The method 300 may include determining an emotion classification expressed in a facial expression from a sequence of facial expressions. An emotion classification may include neutral, angry, disgusted, happy (smiling), surprised, or sad. The method 300 may include determining the emotion classification with minimal additional computational effort (e.g., power, time, heat, etc.). The method 300 may include estimating positions for a set of facial features, such as landmarks. The landmark positions may include positions of a corner, middle, or top of an eye, corner, middle, or top of a mouth, points on a nose, etc. In an example, the landmark positions may be estimated using regularized linear regressors. For example, independent variables set between zero and one. The regularized linear regressors may be used with a histogram of image gradients for object detection. The object detection may detect facial features that may be mapped to landmark points. In an example, the method 300 may include generating a set of blendshape weights to animate an avatar. Blendshape weights of facial action units that are not used in emotion classification may be determined separately from blendshape weights of facial action units that are used in emotion classification. For example, landmark points may include a set of landmark points that are not used in emotion classification and a set of landmark points that are used in emotion classification. The sets of landmark points may be predetermined or determined based on the emotion classification for an animation.

Determining the emotion classification may include using a geometric distance from a first landmark point to a second landmark point in the facial expression. The geometry information may include a difference between the landmark positions of an estimated neutral expression of a face or facial feature and a current frame's landmark positions. For example, the geometry information may include a difference between an eyebrow landmark point in a neutral expression and the eyebrow landmark point in a current expression. From the geometry information, an emotion classification may be determined. To estimate the neutral expression of the current subject, several approaches may be used, such as median filtering, averaging, or a predetermined neutral classifier. For example, a neutral expression may include median values of a number of faces with a closed mouth.

Determining the emotion classification may include determining whether a density of landmark points in an area of the face in the facial expression exceeds a threshold. The textual information may include a concatenation of an image feature of a neutral expression and an image feature of a current frame. Textual information may include determining a density of landmark points in an area of the face in the facial expression and determining whether that density exceeds a predetermined threshold. The threshold may include a range (e.g., above a first predetermined threshold may indicate anger and above a second predetermined threshold may indicate disgust where anger would include the range above the first predetermined threshold and below the second predetermined threshold). The method 300 may include using the same image descriptor to detect facial landmarks and textural variations. This may use negligible or very little additional computation cost (e.g., can be done quickly, efficiently, with fewer cycles than other methods, with less heat, etc.) for emotion classification. The output of emotion classification may be a set of probabilities for emotion categories (e.g., six standard emotion categories of neutral, angry, disgust, happy, surprise, and sad).

In an example, both the geometric distance and the density of landmark points in the area of the face may be used to determine the emotion classification. In another example, a model may be used to determine the emotion classification using facial expressions with known emotion classifications, such as predetermined facial expressions, facial expressions stored in a database, or modeled facial expressions. The modeled facial expressions may include a model between an input image and an emotional intensity. The method 300 may include determining an emotional intensity of a facial expression and using the intensity to animate an avatar. Determining an emotion classification may include determining the emotion classification semantically, such as by determining the classification of an emotion rather than solely on facial expressions. Determining the emotion classification may be efficient compared to deciphering emotions using facial expressions. In an example, the method 300 may include determining the alternative avatar expression using the emotion classification. In an example, both geometry information (fg) and textural information (fi) may be used together to determine an emotion classification. For example, a final feature may include a concatenation of fg and fi, (fg,fi). In an example, a simple support vector machine (SVM) with several thousands of training examples may be used. In another example, any kind of machine learning technique may be used for making an emotion classification.

In an example, animating the avatar may include animating the avatar using the emotion classification. In an example, animating the avatar may include using dynamic weight adjustment. The method 300 may include computing an emotion intensity for an emotion classification (or probabilities of an emotion classification). An emotion intensity may be used as a blending weight of the corresponding emotional blendshapes of an avatar. There may be a conflict between a blendshape weight from a facial mesh tracker and a blendshape weight from an emotion classification. If there is a conflict, the blendshape weights may be dynamically renormalized according to the emotion intensity. For examples, in surprise face, the tracker may increase the weight of a mouth openness blendshape and the emotion classifier may increase the weight of a surprise blendshape. Simple addition of these blendshapes may result in an unnatural mouth openness. This issue may be corrected by dynamically adjusting the emotion blendshape weight to have the same mouth openness from as the tracker weight of the mouth openness blendshape. Other conflicting blendshapes may also be corrected using this technique. In an example, an alternative avatar expression may be determined using the emotion classification or the emotion intensity or both. For example, the alternative avatar expression may include steam coming from the avatar's ears when the emotion classification is anger.

In another example, animating the avatar may include generating and using canned animation. An emotion intensity may be used to trigger a canned animation. A canned animation may include any predetermined animation, such as a GIF image, a video, a prerecorded animation of a specified avatar, an alternative avatar expression, or the like. The canned animation may include using the alternative avatar expression to animate an avatar. The alternative avatar expression may be determined using the emotion classification or the emotion intensity or both. For example, the alternative avatar expression may include steam coming from the avatar's ears when the emotion classification is anger. An emotion intensity may be aggregated over several frames. The aggregated emotion intensity may be used to trigger a canned animation. For example, if an emotion intensity remains high for some, a majority, or all of the several frames, the canned animation may be triggered.

Figure 4:
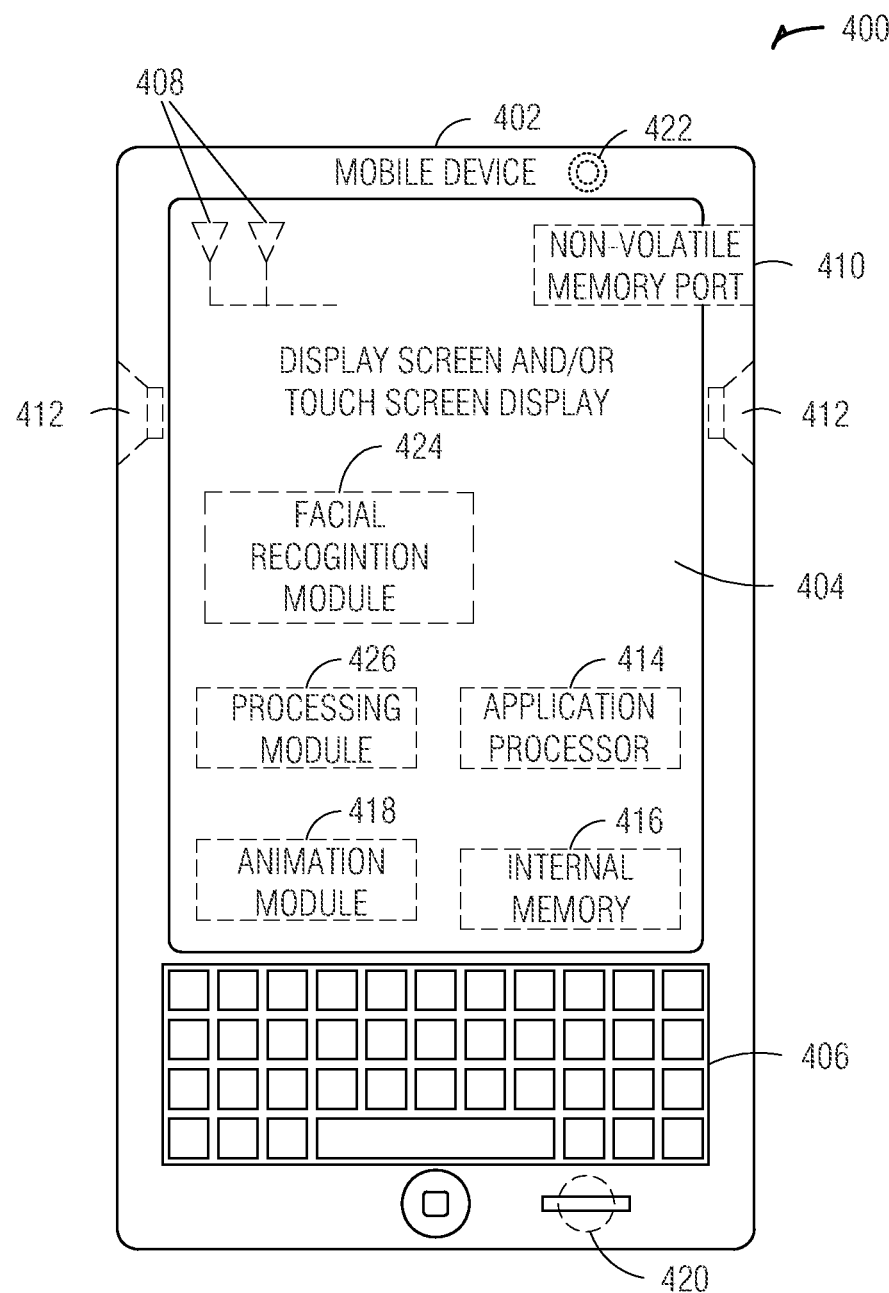
FIG. 4 is a diagram illustrating a mobile device on which the configurations and techniques described herein may be deployed, according to an embodiment.

FIG. 4 is a diagram illustrating a mobile device 400 on which the configurations and techniques described herein may be deployed, according to an embodiment. FIG. 4 provides an example illustration of a mobile device 400, such as a user equipment (UE), a mobile station (MS), a mobile wireless device, a mobile communication device, a tablet, a handset, or other type of mobile wireless computing device. The mobile device 400 may include one or more antennas 408 within housing 402 that are configured to communicate with a hotspot, base station (BS), an eNB, or other type of WLAN or WWAN access point. The mobile device may be configured to communicate using multiple wireless communication standards, including standards selected from 3GPP LTE, WiMAX, High Speed Packet Access (HSPA), Bluetooth, and Wi-Fi standard definitions. The mobile device 400 may communicate using separate antennas for each wireless communication standard or shared antennas for multiple wireless communication standards. The mobile device 400 may communicate in a WLAN, a WPAN, and/or a WWAN.

FIG. 4 also provides an illustration of a microphone 420 and one or more speakers 412 that may be used for audio input and output from the mobile device 400. A display screen 404 may be a liquid crystal display (LCD) screen, or other type of display screen such as an organic light emitting diode (OLED) display. The display screen 404 may be configured as a touch screen. The touch screen may use capacitive, resistive, or another type of touch screen technology. An application processor 414 and a graphics processor may be coupled to internal memory 416 to provide processing and display capabilities. A non-volatile memory port 410 may also be used to provide data input/output options to a user. The non-volatile memory port 410 may also be used to expand the memory capabilities of the mobile device 400. A keyboard 406 may be integrated with the mobile device 400 or wirelessly connected to the mobile device 400 to provide additional user input. A virtual keyboard may also be provided using the touch screen. A camera 422 located on the front (display screen) side or the rear side of the mobile device 400 may also be integrated into the housing 402 of the mobile device 400.

The mobile device 400 may include a facial recognition module 424, a processing module 426, or an animation module 418. In an example, the mobile device 400 may include an image capture device, such as the camera 422. The image capture device may capture a series of images of a face.

The facial recognition module 424 may detect a sequence of facial expressions of the face from the series of images. In an example, the facial recognition module 424 may detect the sequence of facial expressions during a specific time frame, such as over a period of milliseconds, seconds, minutes, etc. For example, the facial recognition module 424 may detect if the sequence of facial expressions is completed before a specific amount expires. The facial recognition module 424 may detect movement of a specified landmark point on the face to detect the sequence of facial expressions. The movement may be a repeated movement, such as raising eyebrows three, four, or five times, blinking twice, shaking head repeatedly, etc. To detect movement of the specified landmark point, the facial recognition module 424 may use dynamic time warping as described above. The facial recognition module 424 may commence detecting the sequence after an indication to enter an alternative avatar expression mode is received (by the facial recognition module 424, the processing module 426, or the like). The indication may be a user indication.

The processing module 426 may determine an alternative avatar expression mapped to the sequence of facial expressions. The processing module 426 may use hand gestures or shoulder motions, such as from the series of images, to determine the alternative avatar expression. The animation module 418 may animate an avatar using the alternative avatar expression. In an example, the animation module 418 may animate the avatar by mimicking the sequence of facial expressions. The animation module 418 may animate separate parts of the avatar concurrently when mimicking the sequence of facial expressions and using the alternative avatar expression. For example, mimicking the sequence of facial expressions may result in an avatar animation that may animate the face of the avatar to smile and the alternative avatar expression may animate the face of the avatar to have the eyes of the avatar pop out. In this example, both animations may be done concurrently so the avatar's face smiles and the eyes pop out. The animation module 418 may animate the avatar in a blended animation when mimicking the sequence of facial expressions and using the alternative avatar expression. The animation module 418 may smooth out interference in the blended animation by removing artifacts.

In another example, the alternative avatar expression may be overlaid on the mimicked animation using a series of images, such as a Graphics Interchange Format (GIF) image or a video. The overlay may be done concurrently with the mimicked animation. In other examples, the alternative avatar expression may cause the avatar to stop being animated with the mimicked animation and only display the alternative avatar expression. The alternative avatar expression may be a user defined alternative avatar expression. A user may also define the sequence of facial expressions that is mapped to an alternative avatar expression.

In an example, the processing module 426 may determine an emotion classification expressed in a facial expression from the sequence of facial expressions. Emotion classification may include using geometric information of facial features or textural information around those feature positions. In an example, facial emotions may be classified into different emotional groups, such as neutral, anger, disgust, happiness, surprise, or sadness. Some of them, for example, surprise, may be estimated using geometric information such as distance between eye and eyebrow, and some of them, for example, anger, may be estimated using textural information such as wrinkles between eyebrows, etc. Other emotion classifications may be estimated using both geometry and texture information. For example, geometric information of facial features and textural variations around facial features may be combined into a single framework to increase the accuracy of emotion classification.

The processing module 426 may determine the emotion classification using a geometric distance from a first landmark point to a second landmark point in the facial expression. The geometry information may include a difference between the first landmark point and the second landmark point. In an example, the first landmark point may include an estimate of a landmark position for a neutral expression of the face and the second landmark point may include a current frame's landmark point. To estimate the neutral expression of the face, the processing module 426 may use several approaches such as median filtering, averaging, dedicated neutral classifier, or the like. In an example, a neutral expression may include a median value of all faces with a closed mouth.

The processing module 426 may determine the emotion classification by determining whether a density of landmark points in an area of the face in the facial expression exceeds a threshold. The density of landmark points in an area of the face may include textual information, such as a density of landmark points between a set of eyebrows. In another example, the processing module 426 may determine the emotion classification using a geometric distance and using a density of landmark points in an area of a face.

In an example, the processing module 426 may determine the alternative avatar expression using the emotion classification. The alternative avatar expression may be mapped to the emotion classification. For example, the emotion classification may be surprise and the alternative avatar expression may be similar to the jaw drop of FIG. 2B. In another example, an alternative avatar expression may be mapped to an emotion classification as defined by a user indication.

The animation module 418 may animate the avatar using the emotion classification. For example, the animation module 418 may use dynamic weight adjustment to animate the avatar. In an example, an emotion intensity (or probability) may be determined or estimated. The emotion intensity may be used as a blending weight for the corresponding emotion blendshape of an avatar. There may be conflicts between a blendshape weight from a facial mesh tracker and a blendshape weight from an emotion classification. The conflict may be corrected by dynamically renormalizing the weights according to an emotion intensity. For example, in a surprise face, the tracker may increase the weight of a mouth openness blendshape and the emotion classifier may increase the weight of a surprise blendshape. Addition of these blendshapes may result in an unnatural mouth openness. This issue may be corrected by dynamically adjusting an emotion blendshape weight to have the same mouth openness from the tracker. In another example, the animation module 418 may use a canned animation to animate the avatar. An emotion intensity may be used to trigger a canned animation. This usage may include the GIF animation described above for the alternative avatar expression. Emotion intensity may be aggregated over several frames and the canned animation may be triggered when an emotion intensity is present for some, a majority, or all of the several frames.

Figure 5:
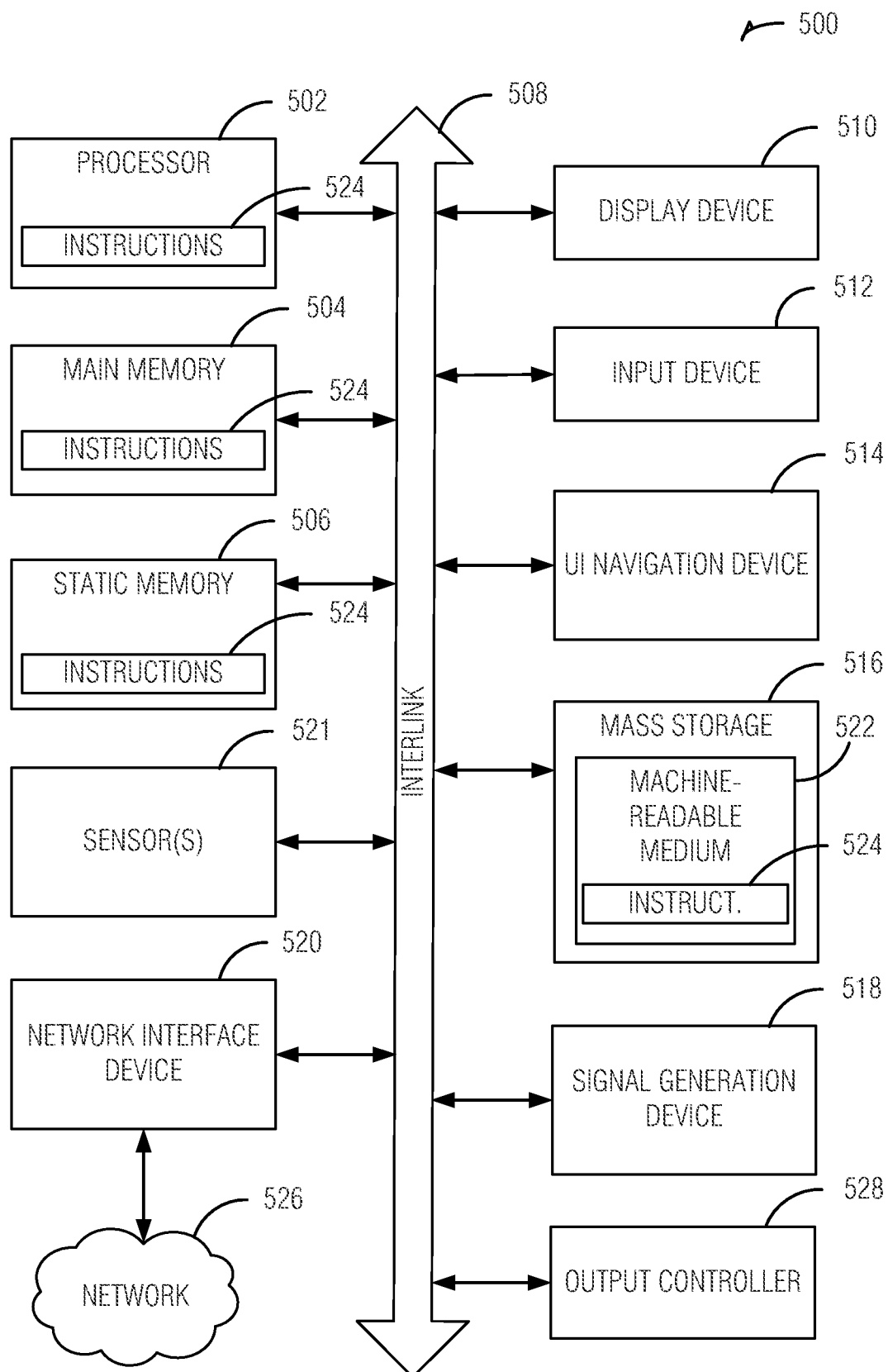
FIG. 5 is a block diagram of a machine upon which any one or more of the techniques (e.g., methodologies) discussed herein may perform, according to an embodiment.

FIG. 5 is a block diagram of a machine 500 upon which any one or more of the techniques (e.g., methodologies) discussed herein may perform, according to an embodiment. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks. The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Figure 6:
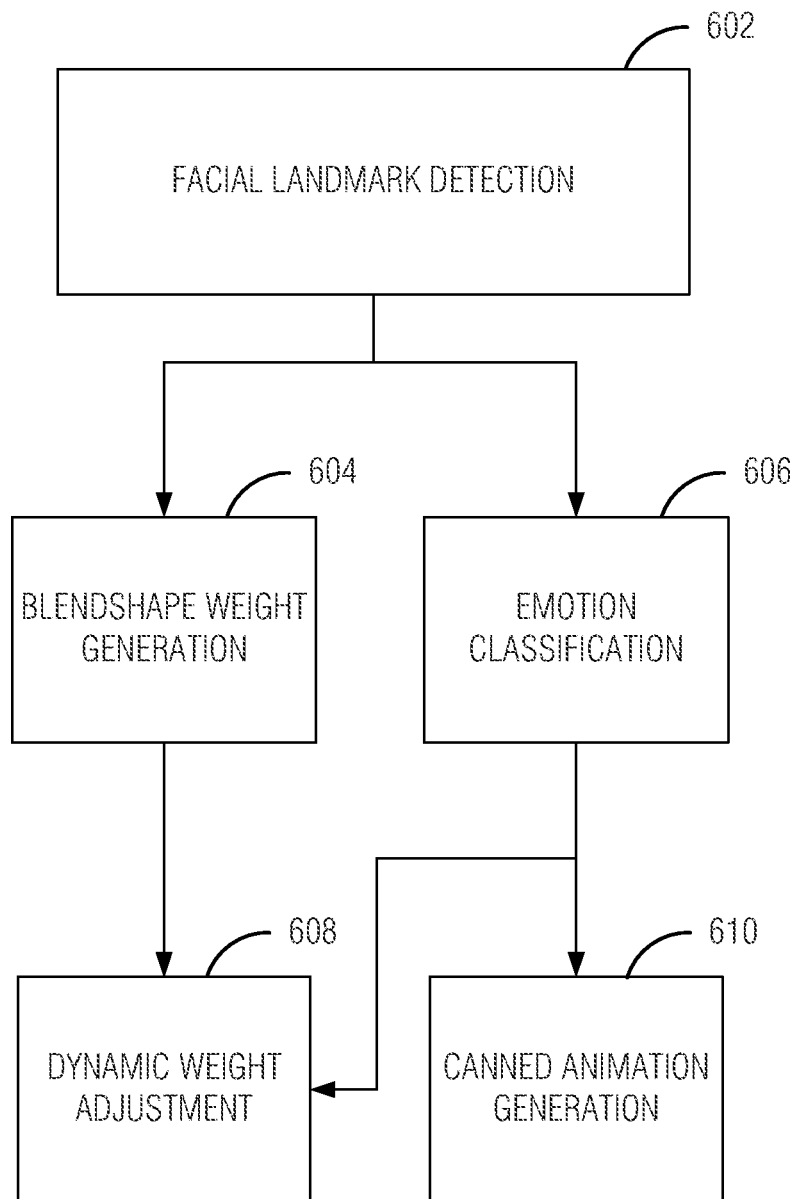
FIG. 6 is a flowchart illustrating a method for animating an avatar using emotion classification, according to an embodiment.

FIG. 6 is a flowchart illustrating a method 600 for animating an avatar using emotion classification, according to an embodiment. In an example, the method 600 may be combined with aspects of the method 300 described above. In another example, any aspects of the method 300 described above may be done independently of method 300, such as using method 600. The method 600 may include an operation 602 to detect one or more facial landmarks. In an example, geometric information of facial features and textural variations around facial features may be used and combined into a single framework to increase the accuracy of emotion classification. FIG. 6 shows a method that describes an example of an overall flowchart of emotional classification and its usage on avatars in visual communication. The method 600 may include an operation 604 to generate blendshape weights. The method 600 may include an operation 606 to determine emotion classification for a facial expression. In an example, the method 600 includes an operation 608 to do dynamic weight adjustment of the blendshape weight using the emotion classification. In another example, the method 600 includes an operation 610 to do canned animation generation using the emotion classification.

VARIOUS NOTES & EXAMPLES

Each of these non-limiting examples may stand on its own, or may be combined in various permutations or combinations with one or more of the other examples.

Example 1 includes the subject matter embodied by a system for mapping facial expressions to an alternative avatar expression comprising: an image capture device to capture a series of images of a face, a facial recognition module to detect a sequence of facial expressions of the face from the series of images, a processing module to determine the alternative avatar expression mapped to the sequence of facial expressions, and an animation module to animate an avatar using the alternative avatar expression.

In Example 2, the subject matter of Example 1 can optionally include wherein to detect the sequence of facial expressions, the facial recognition module is to detect the sequence of facial expressions during a specific time frame.

In Example 3, the subject matter of one or any combination of Examples 1-2 can optionally include wherein to determine the alternative avatar expression, the processing module is to use hand gestures from the series of images.

In Example 4, the subject matter of one or any combination of Examples 1-3 can optionally include wherein to determine the alternative avatar expression, the processing module is to use shoulder motions from the series of images.

In Example 5, the subject matter of one or any combination of Examples 1-4 can optionally include wherein to detect the sequence of facial expressions, the facial recognition module is to detect movement of a specified landmark point on the face.

In Example 6, the subject matter of one or any combination of Examples 1-5 can optionally include wherein to detect movement of the specified landmark point on the face, the facial recognition module is to detect repeated movement.

In Example 7, the subject matter of one or any combination of Examples 1-6 can optionally include wherein to detect movement of the specified landmark point on the face, the facial recognition module is to use dynamic time warping.

In Example 8, the subject matter of one or any combination of Examples 1-7 can optionally include wherein the alternative avatar expression is a user defined alternative avatar expression.

In Example 9, the subject matter of one or any combination of Examples 1-8 can optionally include wherein the animation module is to animate the avatar by mimicking the sequence of facial expressions.

In Example 10, the subject matter of one or any combination of Examples 1-9 can optionally include wherein the animation module is to animate separate parts of the avatar concurrently when mimicking the sequence of facial expressions and using the alternative avatar expression.

In Example 11, the subject matter of one or any combination of Examples 1-10 can optionally include wherein the alternative avatar expression includes a Graphics Interchange Format (GIF) image.

In Example 12, the subject matter of one or any combination of Examples 1-11 can optionally include wherein the animation module is to animate the avatar in a blended animation when mimicking the sequence of facial expressions and using the alternative avatar expression.

In Example 13, the subject matter of one or any combination of Examples 1-12 can optionally include wherein the animation module is to smooth out interference in the blended animation by removing artifacts.

In Example 14, the subject matter of one or any combination of Examples 1-13 can optionally include wherein the facial recognition module is to detect the sequence of facial expressions of the face after receiving a user indication to enter an alternative avatar expression mode.

In Example 15, the subject matter of one or any combination of Examples 1-14 can optionally include wherein the processing module is to determine an emotion classification expressed in a facial expression from the sequence of facial expressions.

In Example 16, the subject matter of one or any combination of Examples 1-15 can optionally include wherein to determine the emotion classification, the processing module is to determine the emotion classification using a geometric distance from a first landmark point to a second landmark point in the facial expression.

In Example 17, the subject matter of one or any combination of Examples 1-16 can optionally include wherein to determine the emotion classification, the processing module is to determine whether a density of landmark points in an area of the face in the facial expression exceeds a threshold.

In Example 18, the subject matter of one or any combination of Examples 1-17 can optionally include wherein to determine the alternative avatar expression, the processing module is to determine the alternative avatar expression using the emotion classification.

In Example 19, the subject matter of one or any combination of Examples 1-18 can optionally include wherein to animate the avatar, the animation module is to animate the avatar using the emotion classification.

Example 20 includes the subject matter embodied by a method for mapping facial expressions to an alternative avatar expression comprising: capturing a series of images of a face, detecting a sequence of facial expressions of the face from the series of images, determining the alternative avatar expression mapped to the sequence of facial expressions, and animating an avatar using the alternative avatar expression.

In Example 21, the subject matter of Example 20 can optionally include wherein detecting the sequence of facial expressions includes detecting the sequence of facial expressions during a specific time frame.

In Example 22, the subject matter of one or any combination of Examples 20-21 can optionally include wherein determining the alternative avatar expression includes determining the alternative avatar expression using hand gestures from the series of images.

In Example 23, the subject matter of one or any combination of Examples 20-22 can optionally include wherein determining the alternative avatar expression includes determining the alternative avatar expression using shoulder motions from the series of images.

In Example 24, the subject matter of one or any combination of Examples 20-23 can optionally include wherein detecting the sequence of facial expressions includes detecting movement of a specified landmark point on the face.

In Example 25, the subject matter of one or any combination of Examples 20-24 can optionally include wherein detecting movement of the specified landmark point on the face includes detecting repeated movement.

In Example 26, the subject matter of one or any combination of Examples 20-25 can optionally include wherein detecting movement of the specified landmark point on the face includes using dynamic time warping.

In Example 27, the subject matter of one or any combination of Examples 20-26 can optionally include further comprising receiving a user indication selecting the alternative avatar expression.

In Example 28, the subject matter of one or any combination of Examples 20-27 can optionally include further comprising animating the avatar by mimicking the sequence of facial expressions.

In Example 29, the subject matter of one or any combination of Examples 20-28 can optionally include further comprising animating separate parts of the avatar concurrently when mimicking the sequence of facial expressions and using the alternative avatar expression.

In Example 30, the subject matter of one or any combination of Examples 20-29 can optionally include wherein animating the avatar includes animating the avatar in a blended animation when mimicking the sequence of facial expressions and using the alternative avatar expression.

In Example 31, the subject matter of one or any combination of Examples 20-30 can optionally include further comprising smoothing out interference in the blended animation by removing artifacts.

In Example 32, the subject matter of one or any combination of Examples 20-31 can optionally include wherein the alternative avatar expression includes a Graphics Interchange Format (GIF) image.

In Example 33, the subject matter of one or any combination of Examples 20-32 can optionally include further comprising receiving a user indication to enter an alternative avatar expression mode before detecting the sequence of facial expressions of the face.

In Example 34, the subject matter of one or any combination of Examples 20-33 can optionally include further comprising determining an emotion classification expressed in a facial expression from the sequence of facial expressions.

In Example 35, the subject matter of one or any combination of Examples 20-34 can optionally include wherein determining the emotion classification includes determining the emotion classification using a geometric distance from a first landmark point to a second landmark point in the facial expression.

In Example 36, the subject matter of one or any combination of Examples 20-35 can optionally include wherein determining the emotion classification includes determining whether a density of landmark points in an area of the face in the facial expression exceeds a threshold.

In Example 37, the subject matter of one or any combination of Examples 20-36 can optionally include wherein determining the alternative avatar expression includes determining the alternative avatar expression using the emotion classification.

In Example 38, the subject matter of one or any combination of Examples 20-37 can optionally include wherein animating the avatar includes animating the avatar using the emotion classification.

Example 39 includes at least one machine-readable medium including instructions for receiving information, which when executed by a machine, cause the machine to perform any of the methods of Examples 20-38.

Example 40 includes an apparatus comprising means for performing any of the methods of Examples 20-38.

Example 41 includes the subject matter embodied by an apparatus comprising: means for capturing a series of images of a face, means for detecting a sequence of facial expressions of the face from the series of images, means for determining an alternative avatar expression mapped to the sequence of facial expressions, and means for animating an avatar using the alternative avatar expression.

In Example 42, the subject matter of Example 41 can optionally include wherein the means for detecting the sequence of facial expressions include means for detecting the sequence of facial expressions during a specific time frame.

In Example 43, the subject matter of one or any combination of Examples 41-42 can optionally include wherein the means for determining the alternative avatar expression include means for determining the alternative avatar expression using hand gestures from the series of images.

In Example 44, the subject matter of one or any combination of Examples 41-43 can optionally include wherein the means for determining the alternative avatar expression include means for determining the alternative avatar expression using shoulder motions from the series of images.

In Example 45, the subject matter of one or any combination of Examples 41-44 can optionally include wherein the means for detecting the sequence of facial expressions include means for detecting movement of a specified landmark point on the face.

In Example 46, the subject matter of one or any combination of Examples 41-45 can optionally include wherein the means for detecting movement of the specified landmark point on the face include means for detecting repeated movement.

In Example 47, the subject matter of one or any combination of Examples 41-46 can optionally include wherein the means for detecting movement of the specified landmark point on the face include means for using dynamic time warping.

In Example 48, the subject matter of one or any combination of Examples 41-47 can optionally include further comprising means for receiving a user indication selecting the alternative avatar expression.

In Example 49, the subject matter of one or any combination of Examples 41-48 can optionally include further comprising means for animating the avatar by mimicking the sequence of facial expressions.

In Example 50, the subject matter of one or any combination of Examples 41-49 can optionally include further comprising means for animating separate parts of the avatar concurrently when mimicking the sequence of facial expressions and using the alternative avatar expression.

In Example 51, the subject matter of one or any combination of Examples 41-50 can optionally include wherein the means for animating the avatar include means for animating the avatar in a blended animation when mimicking the sequence of facial expressions and using the alternative avatar expression.

In Example 52, the subject matter of one or any combination of Examples 41-51 can optionally include further comprising means for smoothing out interference in the blended animation by removing artifacts.

In Example 53, the subject matter of one or any combination of Examples 41-52 can optionally include wherein the alternative avatar expression includes a Graphics Interchange Format (GIF) image.

In Example 54, the subject matter of one or any combination of Examples 41-53 can optionally include further comprising means for receiving a user indication to enter an alternative avatar expression mode before detecting the sequence of facial expressions of the face.

In Example 55, the subject matter of one or any combination of Examples 41-54 can optionally include further comprising means for determining an emotion classification expressed in a facial expression from the sequence of facial expressions.

In Example 56, the subject matter of one or any combination of Examples 41-55 can optionally include wherein the means for determining the emotion classification include means for determining the emotion classification using a geometric distance from a first landmark point to a second landmark point in the facial expression.

In Example 57, the subject matter of one or any combination of Examples 41-56 can optionally include wherein the means for determining the emotion classification include means for determining whether a density of landmark points in an area of the face in the facial expression exceeds a threshold.

In Example 58, the subject matter of one or any combination of Examples 41-57 can optionally include wherein the means for determining the alternative avatar expression include means for determining the alternative avatar expression using the emotion classification.

In Example 59, the subject matter of one or any combination of Examples 41-58 can optionally include wherein the means for animating the avatar include means for animating the avatar using the emotion classification.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations.

What is claimed is:

1. At least one storage device comprising a plurality of instructions that, when executed by one or more processors of a compute device, causes the one or more processors to:
    establish a user interface for selection of a facial feature to be used for augmentation, wherein the facial feature to be used for augmentation is beyond the capabilities of a human to express;
    receive, from the user interface, an indication of the facial feature to be used for augmentation;
    access a trigger facial expression, wherein the trigger facial expression is to act as a trigger for augmentation;
    receive, from a camera of the compute device, a plurality of images of a face of a user of the compute device;
    detect the trigger facial expression of the face of the user in the plurality of images; and
    generate, in response to detection of the trigger facial expression, a plurality of augmented images based on the plurality of images of the face of the user, wherein each of the plurality of augmented images is augmented with the facial feature that is beyond the capabilities of a human to express.

2. The at least one storage device of claim 1, wherein to receive the indication of the facial feature to be used for augmentation comprises to receive the indication of the facial feature to be used for augmentation prior to receipt of the plurality of images of the face of the user.

3. The at least one storage device of claim 1, wherein the facial feature is a tongue that has come out of a mouth of the user in a manner that is beyond the capabilities of a human, wherein each of the plurality of augmented images is augmented with a portion of an animation of a tongue coming out of a mouth.

4. The at least one storage device of claim 1, wherein the trigger facial expression is an open mouth,
    wherein to detect the trigger facial expression of the face in the plurality of images comprises to detect that the user has an open mouth.

5. The at least one storage device of claim 4, wherein each of the plurality of augmented images is augmented with a portion of an animation of a tongue coming out of the user's open mouth.

6. The at least one storage device of claim 1, wherein the trigger facial expression is an eyebrow lift.

7. The at least one storage device of claim 1, wherein the facial feature that is beyond the capabilities of a human to express is one of stars over the face of the user, an "X" over each eye of the user, a tongue unrolled out of a mouth of the user, steam that has come out of ears of the user, the face of the user being red, a neck or head of the user spun around, a nose of the user being overgrown, or a vein popped out of a forehead of the user.

8. The at least one storage device of claim 1, wherein the plurality of instructions further causes the one or more processors to:
    establish a second user interface for selection of a second facial feature, wherein the second facial feature is to be exaggerated;

receive, from the second user interface, an indication of the second facial feature that is to be exaggerated;
access a second trigger facial expression corresponding to the second facial feature that is to be exaggerated, wherein the second trigger facial expression is to act as a trigger for augmentation;
receive, from the camera of the compute device, a second plurality of images of the face of the user of the compute device;
detect the second trigger facial expression of the face of the user in the second plurality of images; and
generate, in response to detection of the second trigger facial expression, a second plurality of augmented images based on the second plurality of images of the face of the user, wherein to generate the second plurality of augmented images comprises to exaggerate the second trigger facial expression.

9. At least one storage device comprising a plurality of instructions that, when executed by one or more processors of a compute device, causes the one or more processors to:
establish a user interface for selection of a facial feature to be exaggerated;
receive, from the user interface, an indication of the facial feature to be exaggerated;
access a trigger facial expression corresponding to the facial feature to be exaggerated, wherein the trigger facial expression is to act as a trigger for augmentation;
receive, from a camera of the compute device, a plurality of images of a face of a user of the compute device;
detect the trigger facial expression of the face of the user in the plurality of images; and
generate, in response to detection of the trigger facial expression, a plurality of augmented images based on the plurality of images of the face of the user, wherein to generate the plurality of augmented images comprises to exaggerate the trigger facial expression.

10. The at least one storage device of claim 9, wherein to receive the indication of the facial feature to be exaggerated comprises to receive the indication of the facial feature to be exaggerated prior to receipt of the plurality of images of the face of the user.

11. The at least one storage device of claim 9, wherein the facial feature is a tongue that has come out of a mouth of the user in a manner that is beyond the capabilities of a human,
wherein each of the plurality of augmented images is augmented with a portion of an animation of a tongue coming out of a mouth.

12. The at least one storage device of claim 9, wherein the trigger facial expression is an open mouth,
wherein to detect the trigger facial expression of the face in the plurality of images comprises to detect that the user has an open mouth.

13. The at least one storage device of claim 12, wherein each of the plurality of augmented images is augmented with a portion of an animation of a tongue coming out of the user's open mouth.

14. The at least one storage device of claim 9, wherein the trigger facial expression is an eyebrow lift.

15. The at least one storage device of claim 9, wherein the facial feature is one of an "X" over each eye of the user, a tongue unrolled out of a mouth of the user, steam that has come out of ears of the user, a neck or head of the user spun around, a nose of the user being overgrown, or a vein popped out of a forehead of the user.

16. A system for augmented facial expressions, the system comprising:
a camera to capture a plurality of images of a face of a user of the system;
one or more processors; and
at least one storage device comprising a plurality of instructions that, when executed by the one or more processors, causes the system to:
establish a user interface for selection of a facial feature to be used for augmentation, wherein the facial feature is beyond the capabilities of a human to express;
receive, from the user interface, an indication of the facial feature to be used for augmentation;
access a trigger facial expression, wherein the trigger facial expression is to act as a trigger for augmentation;
capture, with use of the camera, a plurality of images of the face of the user of the system;
detect the trigger facial expression of the face of the user in the plurality of images; and
generate, in response to detection of the trigger facial expression, a plurality of augmented images based on the plurality of images of the face of the user, wherein each of the plurality of augmented images is augmented with the facial feature that is beyond the capabilities of a human to express.

17. The system of claim 16, wherein to receive the indication of the facial feature to be used for augmentation comprises to receive the indication of the facial feature to be used for augmentation prior to receipt of the plurality of images of the face of the user.

18. The system of claim 16, wherein the facial feature is a tongue that has come out of a mouth of the user in a manner that is beyond the capabilities of a human,
wherein each of the plurality of augmented images is augmented with a portion of an animation of a tongue coming out of a mouth.

19. The system claim 16, wherein the trigger facial expression is an open mouth,
wherein to detect the trigger facial expression of the face in the plurality of images comprises to detect that the user has an open mouth.

20. The system claim 19, wherein each of the plurality of augmented images is augmented with a portion of an animation of a tongue coming out of the user's open mouth.

21. The system claim 16, wherein the trigger facial expression is an eyebrow lift.

22. The system of claim 16, wherein the facial feature that is beyond the capabilities of a human to express is one of stars over the face of the user, an "X" over each eye of the user, a tongue unrolled out of a mouth of the user, steam that has come out of ears of the user, the face of the user being red, a neck or head of the user spun around, a nose of the user being overgrown, or a vein popped out of a forehead of the user.

23. The system of claim 16, wherein the plurality of instructions further causes the system to:
establish a second user interface for selection of a facial feature to be exaggerated;
receive, from the second user interface, an indication of the facial feature to be exaggerated;
access a second trigger facial expression corresponding to the facial feature to be exaggerated, wherein the second trigger facial expression is to act as a trigger for augmentation;
receive, from the camera of the system, a second plurality of images of the face of the user of the system;

detect the second trigger facial expression of the face of the user in the second plurality of images; and generate, in response to detection of the second trigger facial expression, a second plurality of augmented images based on the second plurality of images of the face of the user, wherein to generate the second plurality of augmented images comprises to exaggerate the second trigger facial expression.

24. A system for augmented facial expressions, the system comprising:
- a camera to capture a plurality of images of a face of a user of the system;
- one or more processors; and
- at least one storage device comprising a plurality of instructions that, when executed by the one or more processors, causes the system to:
  - establish a user interface for selection of a facial feature to be exaggerated;
  - receive, from the user interface, an indication of the facial feature to be exaggerated;
  - access a trigger facial expression corresponding to the facial feature to be exaggerated, wherein the trigger facial expression is to act as a trigger for augmentation;
  - capture, with use of the camera, a plurality of images of the face of the user of the system;
  - detect the trigger facial expression of the face of the user in the plurality of images; and
  - generate, in response to detection of the trigger facial expression, a plurality of augmented images based on the plurality of images of the face of the user, wherein to generate the plurality of augmented images comprises to exaggerate the trigger facial expression.

25. The system of claim 24, wherein to receive the indication of the facial feature to be exaggerated comprises to receive the indication of the facial feature to be exaggerated prior to receipt of the plurality of images of the face of the user.

26. The system of claim 24, wherein the facial feature is a tongue that has come out of a mouth of the user in a manner that is beyond the capabilities of a human,
  wherein each of the plurality of augmented images is augmented with a portion of an animation of a tongue coming out of a mouth.

27. The system of claim 24, wherein the trigger facial expression is an open mouth,
  wherein to detect the trigger facial expression of the face in the plurality of images comprises to detect that the user has an open mouth.

28. The system of claim 27, wherein each of the plurality of augmented images is augmented with a portion of an animation of a tongue coming out of the user's open mouth.

29. The system of claim 24, wherein the trigger facial expression is an eyebrow lift.

30. The system of claim 24, wherein the facial feature is one of an "X" over each eye of the user, a tongue unrolled out of a mouth of the user, steam that has come out of ears of the user, the face of the user being red, a neck or head of the user spun around, a nose of the user being overgrown, or a vein popped out of a forehead of the user.

* * * * *